No. 840,337.
PATENTED JAN. 1, 1907.
J. E. JOHNSON.
PIPE HANGER.
APPLICATION FILED JULY 26, 1906.
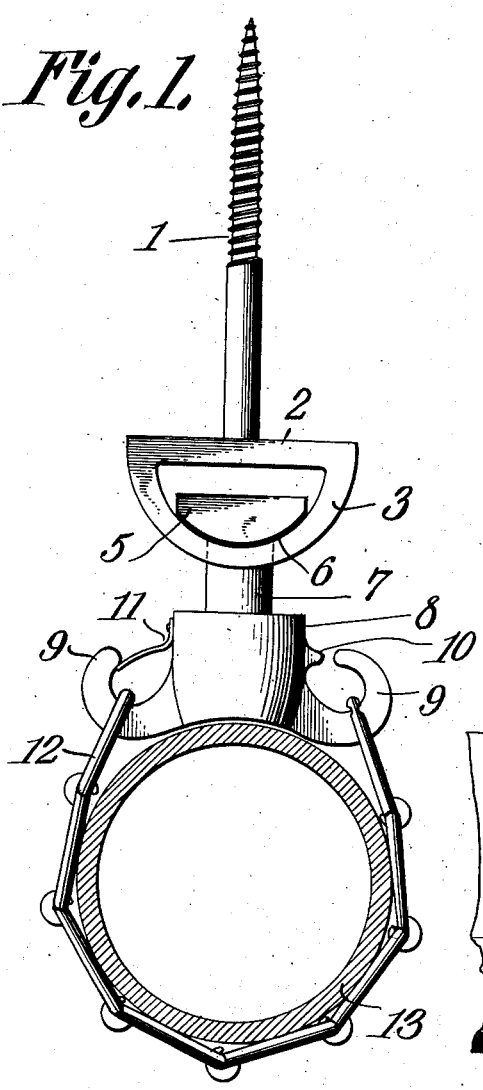
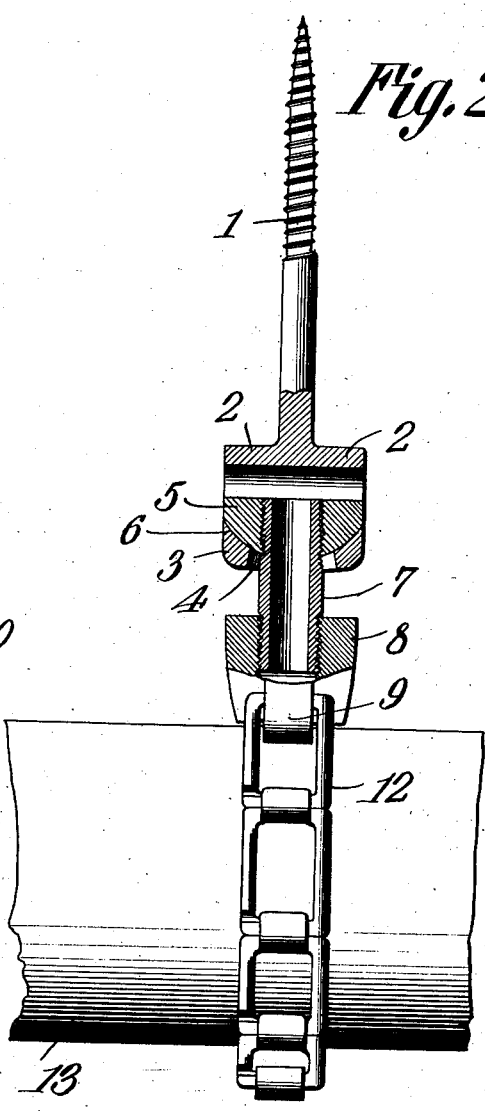
WITNESSES:
John E. Johnson,
INVENTOR.
By C. A. Snow & Co.
ATTORNEYS

UNITED STATES PATENT OFFICE.

JOHN EMIL JOHNSON, OF ISHPEMING, MICHIGAN.

PIPE-HANGER.

No. 840,337.   Specification of Letters Patent.   Patented Jan. 1, 1907.

Application filed July 26, 1906. Serial No. 327,945.

*To all whom it may concern:*

Be it known that I, JOHN EMIL JOHNSON, a citizen of the United States, residing at Ishpeming, in the county of Marquette and State of Michigan, have invented a new and useful Pipe-Hanger, of which the following is a specification.

This invention has relation to pipe-hangers; and it consists in the novel construction and arrangement of its parts, as hereinafter shown and described.

The object of the invention is to provide a hanger of the nature indicated which is simple and cheap in construction, easy of operation and adjustment, and adapted to be readily applied and as readily detached from the wall or other fixed object to which it is attached.

The invention consists, primarily, of a screw having a head provided with a stirrup having a perforation located in alinement with the longitudinal axis of the screw. A head is located within the stirrup, and a nipple is screw-threaded at one end into said head. The opposite end of the nipple is screw-threaded, and upon the last said end a bracket of special construction is secured. The said bracket is provided with laterally-extending hooks, which are adapted to enter the links of a flat chain, and each said hook coöperates with a stop or securing device, also attached to the said bracket for the purpose of retaining the links positively in engagement with the hooks.

In the accompanying drawings, Figure 1 is a side elevation of the pipe-hanger. Fig. 2 is a vertical sectional view of the same.

The screw 1 is provided with the enlarged integral head 2, from the outer side of which depends the integral stirrup 3. The surface of said stirrup is concaved, and the lower portion of the stirrup is provided with a perforation 4, which is located in alinement with the longitudinal axis of the said screw. A head 5 fits within the said stirrup 3 and the head 2 of the screw 1. The lower surface of the said head 5 is convexed, as at 6, and conforms in contour to the inner surface of the stirrup 3.

The upper end of the nipple 7 is screw-threaded into the head 5 and extends entirely through the same. The said nipple passes through the perforation 4. The diameter of the perforation 4 is greater than that of the nipple 7. Consequently the said nipple may have a slight universal swing within said perforation. The bracket 8 is screw-threaded upon the lower end of the nipple 7. Said bracket is provided on each side with the laterally-disposed hooks 9 9. Opposite the end of one of the said hooks 9 is located a lug or bead 10, and the space between the end of the said hook 9 and the said bead 10 is just sufficient to receive that portion of the link of a sprocket-chain which is located between the notches in the opposite sides thereof, usually adjoining the end of the link, so that the link of a sprocket-chain may be slipped sidewise into the said hook 9 and when inserted may be swung down and cannot be disconnected from the said hook until the operation above described is reversed. The snap-spring 11 is attached to the bracket 8 and coöperates with the end of the opposite hook 9 in retaining the link at the other end of the chain in positive engagement with the said bracket 8.

The chain 12 is preferably of the sprocket type, although any other form of chain which is flat and will lie closely against the sides of the pipe 13 may be employed. The said chain 12 passes around the pipe 13 and lies flat against the same, and, as above described, the end links of the chain are positively secured in engagement with the hooks 9 9. For different sizes of pipe the chain 12 may be lengthened or shortened by adding links to or taking links from the same. The said chain when of the sprocket type is composed of the usual links, which are engaged with each other by sidewise movement and cannot be disengaged until swung into certain relations with each other, when the space between the hook of one link and the end thereof will permit of lateral movement of the next adjoining link.

Having described my invention, what I claim as new, and desire to secure by Letters Patent, is—

1. A pipe-hanger comprising an attaching means having an integral head with an integral stirrup depending therefrom, said stirrup having a perforation, a head located within the stirrup, a nipple attached to the head within the stirrup and passing through the stirrup perforation, a bracket attached to the lower end of said nipple and having oppositely-disposed hooks, a chain linked at its ends upon said hooks, and means attached to the bracket for positively retaining the linked ends of the chain in engagement with said hooks.

2. A pipe-hanger comprising an attaching means having an integral head and an integral concaved stirrup depending therefrom, said stirrup being provided with a perforation, a head having a convex surface which bears against the concaved surface of said stirrup, a nipple passing through the stirrup perforation and attached to said convexed head, a bracket attached to said nipple and having oppositely-disposed hooks, a chain linked at its ends to said hooks, and means carried by the bracket for positively retaining the links of the chain in engagement with the said hooks.

3. A pipe-hanger comprising an attaching means having an integral head with an integral stirrup depending therefrom, a head received within the said stirrup, said stirrup having a perforation, a member attached to said head and passing through said perforation, a bracket attached to the lower end of said member and having oppositely-disposed hooks, said bracket having at one side a hook located opposite the end of one of the hooks and at its opposite side a snap-spring bearing against one of said hooks, a chain adapted to be moved sidewise within the space between said lug and its opposite hook end and when swung down being retained upon the said hook, the link at the opposite end of said chain adapted to be passed over the opposite hook of the bracket and held in engagement therewith by the said snap-spring.

In testimony that I claim the foregoing as my own I have hereto affixed my signature in the presence of two witnesses.

JOHN EMIL JOHNSON.

Witnesses:
 HARRY WAITE,
 W. K. DAVISON.